Oct. 28, 1958 — C. W. HARRIS — 2,858,453
SCANNING DEVICE
Filed May 16, 1955 — 2 Sheets-Sheet 1

INVENTOR.
CLYDE W. HARRIS
BY
D. Gordon Angus
ATTORNEY

Oct. 28, 1958     C. W. HARRIS     2,858,453
SCANNING DEVICE

Filed May 16, 1955     2 Sheets-Sheet 2

INVENTOR.
CLYDE W. HARRIS

BY
*D. Gordon Angus*
ATTORNEY

2,858,453

SCANNING DEVICE

Clyde W. Harris, Duarte, Calif., assignor to Aerojet-General Corporation, Azusa, Calif., a corporation of Ohio Application May 16, 1955, Serial No. 508,353

6 Claims. (Cl. 250—201)

This invention relates to the detection of objects in space and more particularly to objects of the character from which energy such as visible or detectable light rays are radiated. The principal object of this invention is to provide means for pointing to or sighting on a target or object in space.

In accordance with my invention, I provide a pointing or sighting system which operates from radiant energy emanating from the target. It is known that energy is radiated from many bodies. For example, the hot engine of an aircraft gives off radiation, particularly infrared energy which can be detected at a considerable distance by suitably sensitive detectors. In accordance with the present invention I cause some of the radiant energy from the target to be received upon a rotating mirror or optical device which thus rotates the rays around the axis of rotation. In accordance with a feature of the invention, I place a number of detectors sensitive to the radiation at positions around the axis of rotation. Thus, the detectors scan the field of view as the mirror rotates.

I carry the outputs of the detectors, in amplified form if desired, to a plurality of lamps corresponding in number and position relative to the axis of rotation to the detectors. A second mirror, corresponding to the first-mentioned mirror also on an axis of rotation receives light from the lamps and directs them to an observer. The lines of light seen by the observer through the slits from the lamps indicate the position of the target.

The foregoing and other features of the invention will be better understood from the following detailed description and the accompanying drawings of which:

Figure 1:
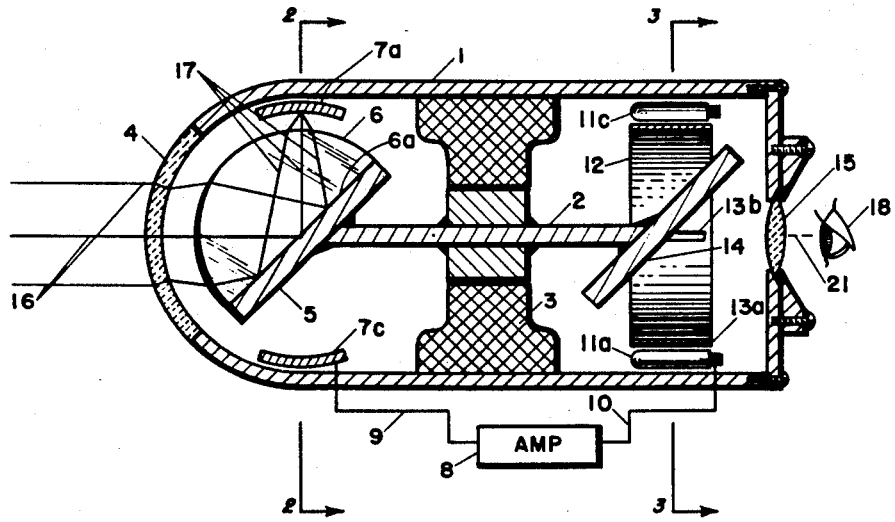
Fig. 1 is a cross-section view taken at line 1—1 of Fig. 2.
Figure 2:
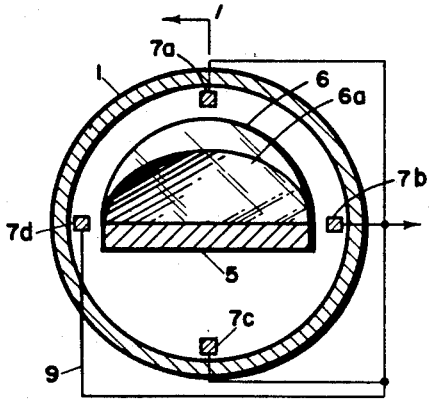
Fig. 2 is a cross-section view taken at line 2—2 of Fig. 1, the illustration also showing the parallel electrical connections of detectors to each other.
Figure 3:
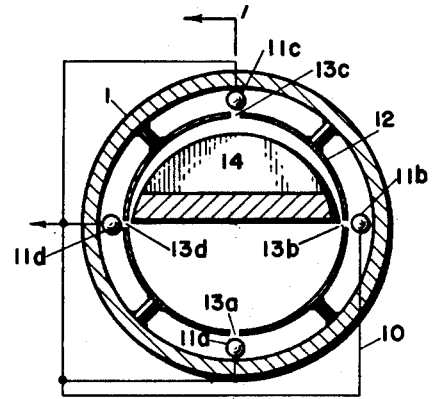
Fig. 3 is a cross-section view taken at line 3—3 of the illustration showing also the parallel electrical connections of lamps to each other.
Figure 4:
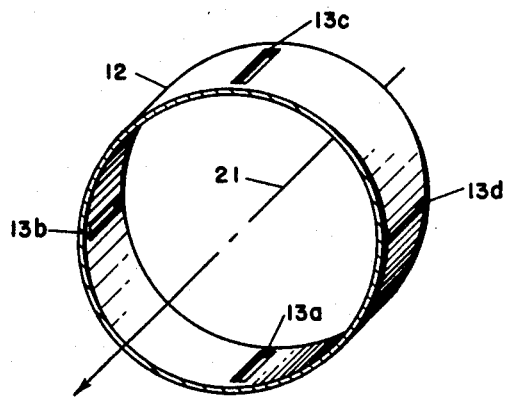
Fig. 4 shows concentric screen used in the arrangement.

Referring to the drawing, the device comprises a housing 1 having a shaft 2 driven by a motor designated 3, within the housing. At the front end of the housing there is provided an opening closed by a window 4 of a suitable transparent material. The front end of the shaft 2 has fastened to it a disk 5 which is a plane surface lying at an oblique angle to the axis of the shaft. A hemispherical lens 6 having a reflecting surface 6a is mounted on disk 5, as shown. Located concentrically around the forward end of the shaft and spaced 90° apart within the housing 1 are four detectors 7a, 7b, 7c and 7d. These detectors should be of a type sensitive to the radiation to be detected; for infrared detection they should be of the infrared detecting type, such as lead sulphide cells. They are so shaped and arranged as to be substantially parts of a sphere surrounding the hemispherical member 6. They form very narrow segments and are only "slits" in width.

The outputs from all four of the detectors are brought to an amplifying means 8, and this may be done by connecting the detector outputs to the input line 9 to the amplifier. The detector outputs are shown connected in parallel although it will be understood that they could, if desired, be connected in series. The output of the amplifier is carried over a line 10 to four lamps 11a, 11b, 11c and 11d. These four lamps are arranged between the wall 1 and a concentric screen 12. Adjacent each lamp there is a respective narrow opening or slit 13a, 13b, 13c and 13d in the screen.

Mounted on the shaft 2 is a mirror 14. This is preferably a mirror as shown, which lines ein a plane oblique to the axis of the shaft, and preferably parallel to the surface 5. At the rear wall of the housing there is provided a lens or eyepiece 15, aligned with the longitudinal axis of the shaft.

In operation, the device will be aimed in the general direction in space in which it is desired to pick up an object; and the general direction of aiming will be along the longitudinal axis of the shaft. Radiation from the object, such as infrared radiation from a hot body as an engine or the like, will pass through the front window 4 and the radiant incident rays 16 will be reflected and focused along lines 17. Since the shaft is rotating, these reflected lines of radiation will be rotated likewise and will successively fall, in proper focus, on the slitlike detector elements 7a, 7b, 7c and 7d. Each time the radiation falls on one of the detectors, it is energized and its energy is amplified in the amplifier 8 sufficiently to light all four lamps 11a, 11b, 11c and 11d, which are connected in parallel. The plane of surface 14 is related to the plane of surface 5 so that when light is impinging on one of the detector elements, for example 7a, the light from one of the lamps, for example lamp 11a, passing through the slit 13a will impinge on the mirror surface 14 and be reflected through lens 15. Thus an observer having his eye at position 18 in back of lens 15 will see the light as a slit of light corresponding with the dimensions of slit 13a.

Figure 5:
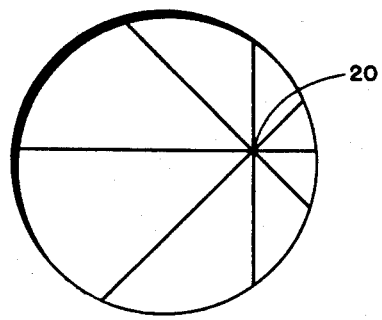
Fig. 5 is an enlarged view showing the lines of light seen by the observer in the use of the system.

As the shaft turns 90°, it picks up radiation from the next detector 7b, which will again cause all four lamps to light, but this time only the lamp 11d will send its light through its slit 13d to the mirror 14 to re-direct the light to the observer through lens 15. This same process continues successively with all four slits as the shaft continues to rotate. The net effect of this action is that the observer will see successive light lines through the lens 15, and since the successive light lines will be arriving from the differently positioned slits spaced 90° apart, the directions of the lines will be different. Since the successive slits will appear in rapid succession, they will all appear to the observer to be existing simultaneously. These form, in effect, two intersecting crosses in the field of view, as illustrated in Fig. 5. The common intersection 20 of the lines indicates the direction of the target source relative to the axis 21 of the instrument.

It will be understood that by my invention I have provided a system which will show the presence and position of radiating objects such as those radiating infrared, in a large field of view and without the accompanying loss of sensitivity previously deemed necessary with other systems. The device of this invention is very compact and simple in that it has only one moving part and requires only simple electronic circuitry. Furthermore, the speed of rotation is not critical.

The concentric optical system permits a fast collector system which covers a wide field of view. The small area slit-like detectors directly scan the field, permitting attainment of a large signal-to-noise ratio.

The cross image is automatically constructed in the proper spaced position independently of motor speed or electronic vagaries. Furthermore, the cross image can be projected on to a screen.

The optical presentation is analogous to a terrestrial telescope and the image is not inverted nor reversed. However, any desired rotation of the image with respect to the object may be readily obtained.

It will be recognized that modifications of the invention may be made by those skilled in the art. For example, the number and positions of the detectors and lamps can be varied. Also the angularity of the two reflecting surfaces 5 and 14 can be changed relative to each other, it simply being required that when one of the detectors is energized, the observer shall view the light reflected from the mirror 14 from a corresponding one of the lamps. Also, although the same shaft is shown driving both reflecting surfaces 5 and 14, it will be understood that separate axes of rotation could be used for the individual mirrors provided both shafts are operated in synchronism.

Greater sensitivity may be achieved at the cost of more electronic complexity. For example, the output of each detector may be separately amplified, and made to "fire" only its corresponding lamp.

It is not necessary that the front optical system be a single hemispherical lens, though this is an advantageous form.

I claim:

1. An object locating device comprising a rotor, a pair of optical reflectors mounted on said rotor nonperpendicular to the axis of rotation, a plurality of radiant energy detectors located at spaced angular positions around a first of the reflectors, whereby rays from the object reflect from said first reflector and are scanned by the detectors successively during rotation of the rotor, a plurality of lamps corresponding in number to the detectors and spaced at different angular positions around the rotor adjacent the second of the reflectors, means connecting the outputs of the detectors to the lamps, screening means between said second reflector and the lamps, slits in said screening means between the respective lamps and the second reflector, whereby an observer looking at light from the second reflector observes lines of light from the respective lamps in response to energization of the respective detectors.

2. Apparatus according to claim 1 in which the two reflectors comprise reflecting surfaces parallel to each other.

3. Apparatus according to claim 1 in which a lens is placed between the observer and the second reflector.

4. An object locating device comprising a rotatable optical reflector with a reflecting surface non-perpendicular to the axis of rotation and adapted to view the object, a plurality of radiant energy detectors located at spaced angular positions around said reflector whereby rays from the object reflected from said reflector impinge on the detectors successively during rotation of the reflectors, a second rotatable reflector, means for rotating both said reflectors at the same rate of speed, a plurality of lamps corresponding in number to the detectors and spaced at different angular positions around the second reflector, in correspondence with the angular positions of the detectors around the first reflector, means connecting the outputs of the detectors to the lamps, screening means between said second reflector and the lamps, slits in said screening means between the respective lamps and the second reflector, whereby an observer looking at light from the second reflector observes lines of light from the respective detectors.

5. Apparatus according to claim 4 in which an amplifying means is connected to the detector outputs.

6. Apparatus according to claim 4 in which optical focusing means is associated with said reflector whereby said rays from said object reflected from said reflector are focused on said detectors.

No references cited.